US012106042B1

(12) United States Patent
Gashi et al.

(10) Patent No.: US 12,106,042 B1
(45) Date of Patent: Oct. 1, 2024

(54) ENHANCED COMPUTER AUTOMATION TO TRANSFER DATA BETWEEN SOFTWARE APPLICATIONS

(71) Applicant: INTERNATIONAL BUSINESS MACHINES CORPORATION, Armonk, NY (US)

(72) Inventors: Aaron Tomor Robert Gashi, Eastleigh (GB); Jack E. Dunning, Eastleigh (GB); Thomas J. Latham, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/332,320

(22) Filed: Jun. 9, 2023

(51) Int. Cl.
*G06F 17/00* (2019.01)
*G06F 9/54* (2006.01)
*G06F 40/174* (2020.01)
*G06F 40/279* (2020.01)

(52) U.S. Cl.
CPC ............ *G06F 40/174* (2020.01); *G06F 9/543* (2013.01); *G06F 40/279* (2020.01)

(58) Field of Classification Search
CPC ....... G06F 40/174; G06F 40/279; G06F 9/543
See application file for complete search history.

(56) References Cited

U.S. PATENT DOCUMENTS

| 10,514,833 | B2 | 12/2019 | Kumar et al. | |
| 10,891,418 | B2* | 1/2021 | Massand | G06F 40/194 |
| 11,321,533 | B2 | 5/2022 | Hewitt et al. | |
| 11,755,348 | B1* | 9/2023 | Varentsov | G06F 9/452 |
| | | | | 709/203 |
| 11,947,946 | B1* | 4/2024 | Rao | G06F 21/57 |
| 2003/0033288 | A1* | 2/2003 | Shanahan | G06F 16/3344 |
| 2004/0205530 | A1* | 10/2004 | Borg | G06F 40/174 |
| | | | | 715/234 |
| 2008/0320411 | A1* | 12/2008 | Chen | G06F 3/0237 |
| | | | | 715/780 |
| 2010/0205530 | A1* | 8/2010 | Butin | G06F 9/453 |
| | | | | 715/765 |

(Continued)

FOREIGN PATENT DOCUMENTS

| CN | 108829301 A | 11/2018 | |
| CN | 113748413 A | * 12/2021 | .......... G06F 11/3438 |

OTHER PUBLICATIONS

Apple, "Copy and translate text from photos on your iPhone or iPad", Accessed on May 10, 2023, 4 pages, https://support.apple.com/en-us/HT212630.

*Primary Examiner* — Laurie A Ries
(74) *Attorney, Agent, or Firm* — Michael A. Petrocelli

(57) ABSTRACT

The automatic computer transfer of data between applications can include detecting a first application is accessed on a device, and a second application is accessed on the device in a predetermined amount of time. It is determined that text typed in the first application matches text from the second application. It is further determined when remaining text from the second application does not match the text typed in the first application. It is further Text from the second application for the first application is suggested based on the determined remaining text from the second application. The suggested text from the second application for the first application is sent to a display to autofill into the first application.

18 Claims, 4 Drawing Sheets

(56) References Cited

U.S. PATENT DOCUMENTS

| | | | |
|---|---|---|---|
| 2011/0113324 A1* | 5/2011 | DeLuca | G06F 40/166 |
| | | | 715/256 |
| 2012/0159378 A1* | 6/2012 | Grassl | G16H 10/20 |
| | | | 715/780 |
| 2012/0330982 A1* | 12/2012 | Arnaud | G06F 16/951 |
| | | | 707/E17.062 |
| 2013/0219257 A1* | 8/2013 | Carmeli | G06F 40/174 |
| | | | 715/226 |
| 2014/0040741 A1* | 2/2014 | van Os | G06F 40/274 |
| | | | 715/780 |
| 2014/0164414 A1* | 6/2014 | Cudak | G06F 16/93 |
| | | | 707/758 |
| 2015/0378978 A1* | 12/2015 | Gross | G06F 40/174 |
| | | | 715/219 |
| 2016/0357730 A1* | 12/2016 | Eberbach | G06F 40/242 |
| 2019/0179881 A1* | 6/2019 | Güngör | G06F 40/163 |
| 2020/0073936 A1* | 3/2020 | Jankowski | G06F 40/279 |
| 2020/0151315 A1 | 5/2020 | Lee et al. | |
| 2020/0193087 A1* | 6/2020 | Kim | G06F 3/04847 |
| 2021/0006943 A1* | 1/2021 | Gross | G06F 3/04883 |
| 2021/0319178 A1* | 10/2021 | Zhang | G06F 40/274 |
| 2021/0342338 A1* | 11/2021 | Nocedal De La Garza | |
| | | | G06F 3/0488 |
| 2022/0358154 A1* | 11/2022 | Yun | G06F 16/353 |
| 2023/0019250 A1* | 1/2023 | Lee | G06F 21/32 |

\* cited by examiner

ENHANCED COMPUTER AUTOMATION TO TRANSFER DATA BETWEEN SOFTWARE APPLICATIONS

BACKGROUND

The present invention relates generally to the field of automatic transfer of data between software applications using a computer.

User computerized devices can allow multiple software applications and electronic documents to be open at once. Oftentimes, users type information from one application or document into another application or document.

Autofill is a function used in some computer applications or programs, which can automatically fill or suggest input in forms, documents, text boxes, or similar with information. Autofill is used to fill out or suggest input for forms with previously entered values, a predetermined value, or transfer information. A computer can autofill or automatically prefill a field automatically to save a user time.

SUMMARY

According to one embodiment of the present invention, a computer-implemented method for automatically transferring data between two applications is disclosed. The computer-implemented method includes detecting, by a computer, a first application being accessed on a device. The computer-implemented method further includes detecting, by the computer, a second application being accessed on the device and the first application is accessed again on the device under a predetermined amount of time. The computer-implemented method further includes responsive to determining the second application is accessed and the first application is accessed again under a predetermined amount of time, determining, by the computer, text typed in the first application under a predetermined amount of time. The computer-implemented method further includes determining, by the computer, at least a portion of the text typed in the first application matches text from the second application. The computer-implemented method further includes determining, by the computer, remaining text from the second application, wherein the remaining text from the second application does not match the text typed in the first application. The computer-implemented method further includes determining, by the computer, suggested text from the second application for the first application, the suggested text being based at least in part, on the determined remaining text from the second application. The computer-implemented method further includes sending, by the computer, the suggested text from the second application for the first application to a display to autofill into the first application.

According to another embodiment of the present invention, a computer program product for automatically transferring data between two applications is disclosed. The computer program product includes one or more computer readable storage media and program instructions stored on the one or more computer readable storage media. The program instructions include instructions to detect a first application being accessed on a device. The program instructions further include instructions to detect a second application being accessed on the device and the first application is accessed again on the device under a predetermined amount of time. The program instructions include instructions to responsive to determining the second application is accessed and the first application is accessed again under a predetermined amount of time, determine text typed in the first application under a predetermined amount of time. The program instructions include instructions to determine at least a portion of the text typed in the first application matches text from the second application. The program instructions include instructions to determine remaining text from the second application, wherein the remaining text from the second application does not match the text typed in the first application. The program instructions include instructions to determine suggested text from the second application for the first application, the suggested text being based at least in part, on the determined remaining text from the second application. The program instructions include instructions to send the suggested text from the second application for the first application to a display to autofill into the first application.

According to another embodiment of the present invention, a computer system for automatically transferring data between two applications is disclosed. The computer system includes one or more computer processors, one or more computer readable storage media, and computer program instructions, the computer program instructions being stored on the one or more computer readable storage media for execution by the one or more computer processors. The program instructions include instructions to detect a first application being accessed on a device. The program instructions further include instructions to detect a second application being accessed on the device and the first application is accessed again on the device under a predetermined amount of time. The program instructions include instructions to responsive to determining the second application is accessed and the first application is accessed again under a predetermined amount of time, determine text typed in the first application under a predetermined amount of time. The program instructions include instructions to determine at least a portion of the text typed in the first application matches text from the second application. The program instructions include instructions to determine remaining text from the second application, wherein the remaining text from the second application does not match the text typed in the first application. The program instructions include instructions to determine suggested text from the second application for the first application, the suggested text being based at least in part, on the determined remaining text from the second application. The program instructions include instructions to send suggested text from the second application for the first application to a display to autofill into the first application.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
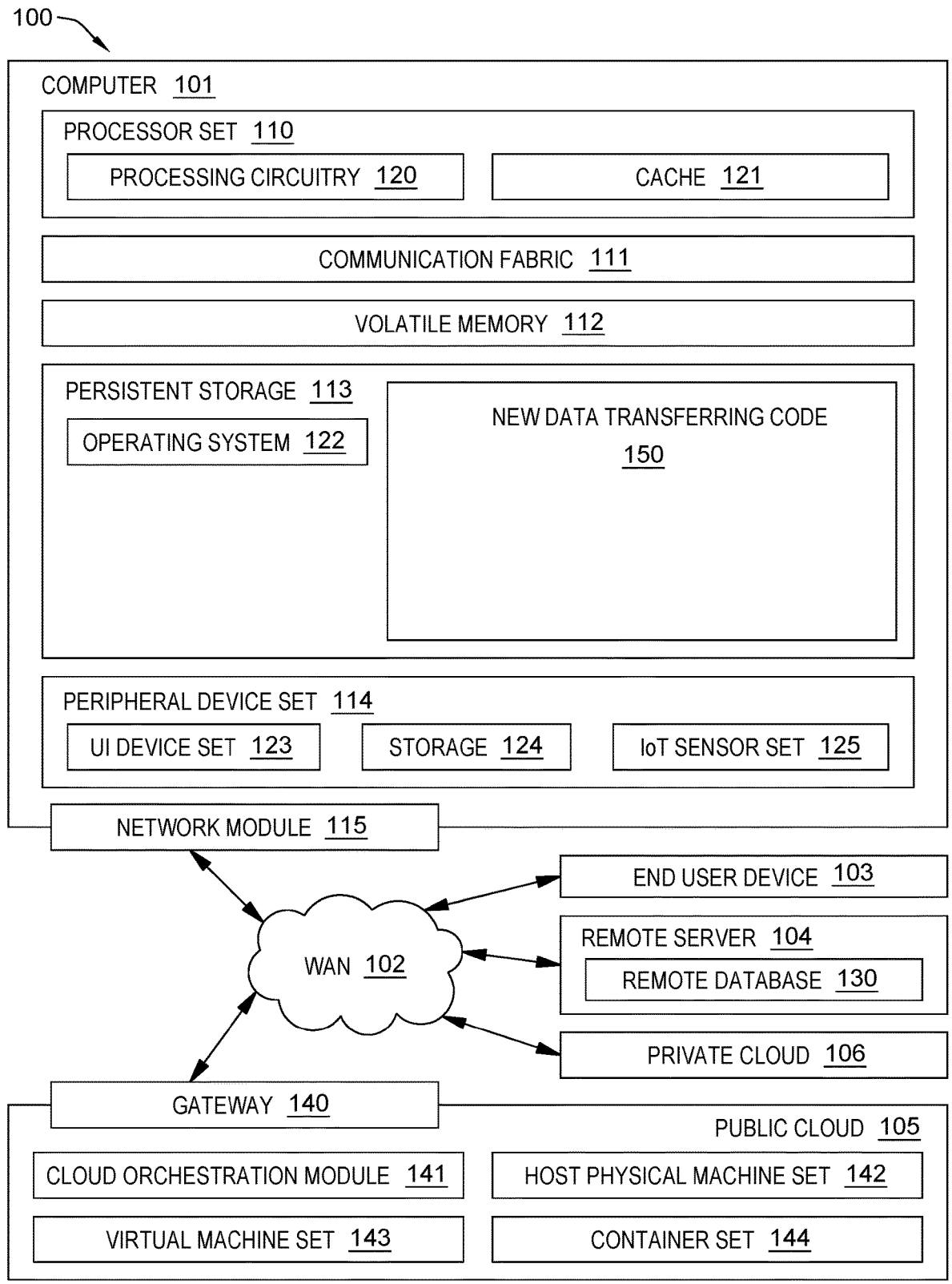
FIG. 1 is a functional block diagram of computing environment, suitable for the execution of at least some of the computer code involved in performing the inventive methods, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Sometimes when a user is typing information into an electronic document, the user is switching back and forth on a user interface between multiple electronic tabs or applications. For example, the user is switching between the electronic document and another document the user is using information from. Autofill saves a user time of typing in information into an electronic document, form, website, application, or similar. However, embodiments of the present invention recognize known autofill methods lack the ability to identify information in a separate application to autofill in the current application. For example, a user has open an electronic document in the web browser application and an electronic photo of a postcard which states an address in the photo application. The user toggles between the web browser application and the photo application in order to correctly type in the address from the electronic photo of a postcard to the electronic document in the web browser application. Embodiments of the present invention recognize toggling between multiple applications increases both the time and likelihood of error in typing in the correct information. Embodiments of the present invention recognize the need for a system to identify when a user is interacting with their device and determine the text from one application the user is typing into a second application and further suggest the remaining text from the first application to autofill into the second application.

Embodiments of the present invention recognize the need for a system to determine the typed information in one application or document is being sources from a different application or document the user has recently accessed. For example, the system determines the user has repeatedly opened the email application and then photo application for under 3 seconds each and determined words from the particular photo being displayed from the photo application match words being typed in by the user into the email application. Embodiments of the present invention determines when a user is attempting to copy information between applications through the monitoring of open app content, photo content, keyboard content, clipboard content, to then be able to provide suggested text from a source application to a destination application.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram of computing environment, generally designated 100, suitable for the execution of at least some of the computer code involved in performing the inventive methods, such as new data transfer code 150, in accordance with at least one embodiment of the present invention. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. n embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In an embodiment, a database may include personal data, content, contextual data, or information related to a user. Consent for accessing and storing such personal data can include opt-in consent which can impose on the user taking an action, that is, authorizing access and storage of data, before personal data is processed. Alternatively, opt-out consent can impose on the user to take an action to prevent the processing of personal data before personal data is processed. In an embodiment, confidential communication system provides information regarding personal data and the nature (e.g., type, scope, purpose, duration, etc.) of the processing. In an embodiment, confidential communication system provides a user with copies of stored personal data. In an embodiment, speech confidential communication system allows for the correction or completion of incorrect or incomplete personal data. In an embodiment, data transfer system allows for the immediate deletion of personal data. In an embodiment, data transfer system provides informed consent, with notice of accessing one or more applications on a user device, suggesting text, and automatically filing text. Alternatively, opt-out consent can impose on the user to take an affirmative action to prevent accessing one or more applications on the user device, suggesting text, and automatically filing text. In an embodiment, data transfer system provides notice and receives informed consent to access one or more applications on a user device, suggest text, and automatically fill in text.

In an embodiment, data transfer system is represented by new data transfer code 150. The first application can be the destination application and the second application can be the source application. Meaning, data found on the source application is transferred to the destination application. In an embodiment, a first application and a second application can include the same application with different windows or tabs being accessed. For example, a web browser app switching between two web browser tabs.

Data transfer system detects a first application is accessed on a user device. For example, data transfer system detects an application is deployed or opened on a user device. Data transfer system detects a second application is accessed on the user device. For example, data transfer system detects another application, different than the first application, is deployed or opened on a user device. Such as, detecting the photo application is accessed then the email application is accessed. For example, data transfer system detects switching between two different applications such as opening an original application, closing that application, opening a new application, and returning to the original application. Data transfer system further determines the first application is accessed again. For example, data transfer system determines the photo application is accessed, the email application is accessed, and then the photo application is accessed again for at least a second time. In an embodiment, data transfer system determines the first application is accessed for at least a second time under a predetermined amount of time threshold. In some embodiments, the predetermined amount of time threshold is the amount of time from when the second application is accessed to when the first application is accessed again for at least the second time. For example, data transfer system determines the photo application is accessed, the email application is accessed, and 4 seconds after the email application is accessed, the photo application is accessed again for the second time. If the predetermined amount of time of threshold from when the second application was accessed to when the first application is accessed again is 5 seconds, the amount of time from when the second application was accessed to when the first application is accessed is under the predetermined amount of time threshold.

In some embodiments, data transfer system detects the switching back to the first application and further determines typing in the first application. In some embodiments, the first application includes a form and data transfer system detects the typing in the form on the first application. In some embodiments, data transfer system monitors utilizing open app content, photo content, keyboard content, clipboard content to determine the switching between one or more applications. In some embodiments, data transfer system further determines an active form in the first application and switching between the first application and the second application. An active form can include a form or webpage where the typing is occurring on the first application, unanswered questions or blanks, or a form with empty space for text still. For example, if the first application included a questionnaire and not all the questions were answered, this can be an active form since there is unanswered questions remaining on the questionnaire form.

In an embodiment, data transfer system further determines text typed in the first application. In some embodiments, data transfer system further determines text typed in the first application under a predetermined amount of time. For example, a form is displayed on the first application on the display of the user device. The form includes both text on the boilerplate of the form which was typed years ago and text typed by the user a few seconds ago. Here, data transfer system identifies the text typed by the user is under a predetermined amount of time of 10 minutes.

In an embodiment, data transfer system utilizes an operating system application program interface (API) to query the text being entered in the first application. In an embodiment, data transfer system utilizes text recognition system to determine all text available in the second application.

In an embodiment, data transfer system determines at least a portion of the text typed in the first application matches a portion of text from the second application. For example, data transfer system determines text "123 Main Street" in first application and further text "123 Main Street, Albany, NY, 12204" in the second application. Here, data transfer system further determines the typed text in the first application "123 Main Street" matches a portion of the text from the second application. In an embodiment, data transfer system utilizes any known natural language processing (NLP) or text analysis to determine at least a portion of the text typed in the first application matches text from the second application. In an embodiment, data transfer system determines a match between the text typed in the first application and a portion of text from the second application if the text typed in the first application is identical to text from the second application. In some embodiments, data transfer system determines a match between the text typed in the first application and a portion of text from the second application if the text typed in the first application is above a predetermined threshold of matching to text from the second application. A predetermined matching can be implemented to be inclusive of minor spelling mistakes, omitted, or additional text. For example, if the predetermined matching threshold is 90% of the text matches, data transfer system determines a match between text found in the first application of "123 Maine Street" (additional "E" at the end of "Main") and "123 Main Street" in the second application since there is a match in the text above 90%.

In an embodiment, data transfer system further determines remaining text from the second application. The remaining text from the second application can include text that does not match the text typed in the first application. From the previous example of "123 Main Street" "in first application and further text "123 Main Street, Albany, NY, 12204" in the second application, data transfer system determines a portion of the typed text in the first application "123 Main Street" matches the text from the second application "123 Main Street." Here, data transfer system further determines the remaining text "Albany, NY, 12204" in the second application because that text is not found in the first application.

In an embodiment, data transfer system determines suggested text from the second application for the first application. The suggested text is based, at least in part, on the determined remaining text from the second application. Following the previous example of "123 Main Street" in first application and further text "123 Main Street, Albany, NY, 12204" in the second application, where data transfer system determines the remaining text of "Albany, NY, 12204" in the second application. Here, data transfer system further determines the remaining text of "Albany, NY, 12204" from the second application is suggested text for the first application.

In an embodiment, data transfer system displays the suggested text from the second application to the first application. In an embodiment, data transfer system receives user input indicating approval of the suggested text from the second application to automatically fill into the first application. In some embodiments, data transfer system automatically fills or inserts the remaining text into the first application.

Figure 2:
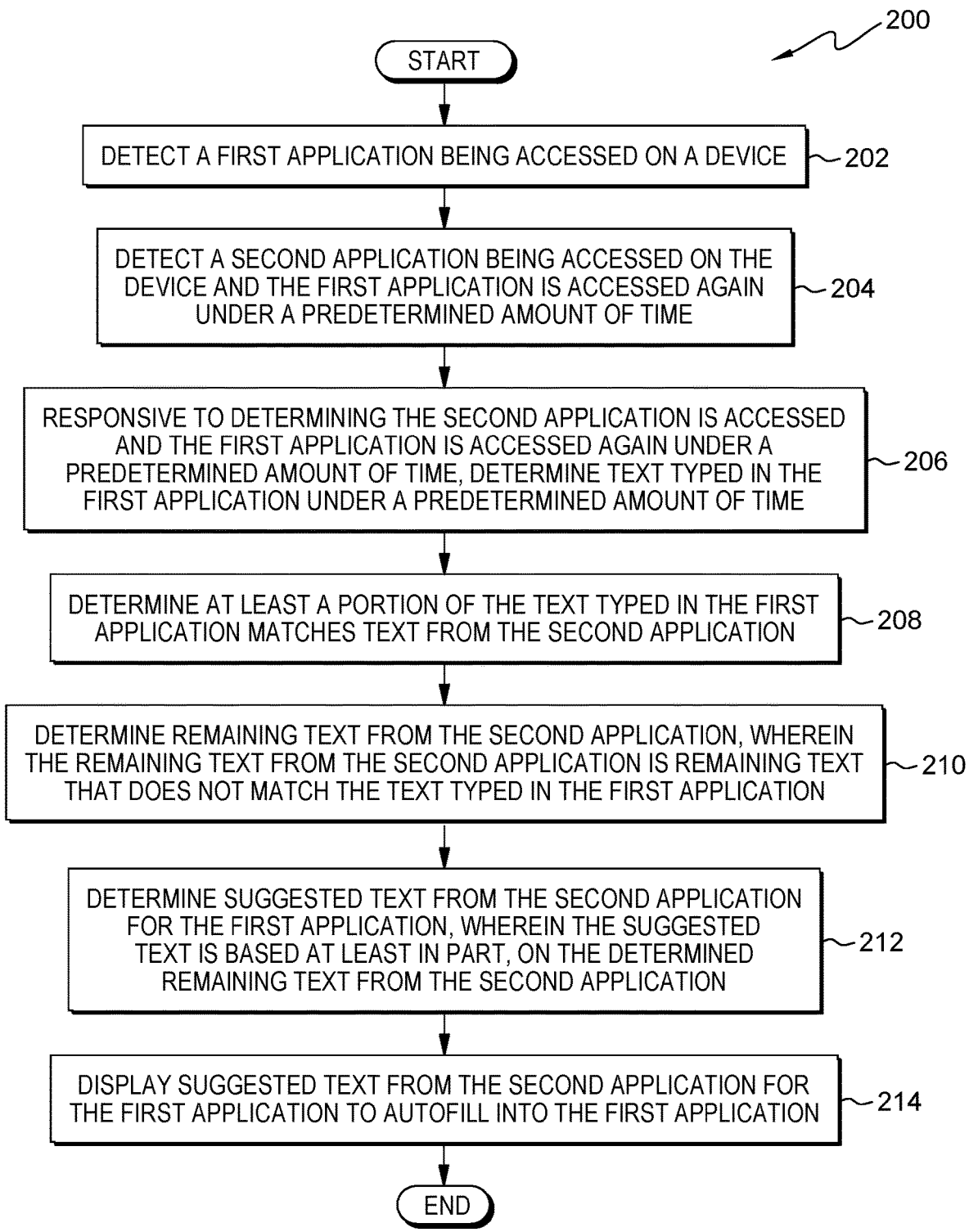
FIG. 2 is a flow chart diagram depicting operational steps for data transfer system, in accordance with at least one embodiment of the present invention.

Referring to FIG. 2, a data transfer system 200, in accordance with at least one embodiment of the present invention includes an implementation of the present disclosure and does not imply any limitations with regard to the environments in which different embodiments may be implemented. Many modifications to the depicted environment may be made by those skilled in the art without departing from the scope of the invention as recited by the claims.

The data transfer system 200 detects a first application being accessed on a device, as shown in block 202.

The data transfer system 200 detect a second application being accessed on the device and the first application is accessed again under a predetermined amount of time, as shown in block 204.

In an embodiment, responsive to determining the second application is accessed and the first application is accessed again under a predetermined amount of time, data transfer system 200, determines text typed in the first application under a predetermined amount of time, as shown in block 206.

In an embodiment, data transfer system 200 determines at least a portion of the text typed in the first application matches text from the second application, as shown in block 208.

In an embodiment, data transfer system 200 determines remaining text from the second application, wherein the remaining text from the second application is remaining text that does not match the text typed in the first application, as shown in block 210.

In an embodiment, data transfer system 200 determines suggested text from the second application for the first application, wherein the suggested text is based at least in part, on the determined remaining text from the second application, as shown in block 212.

In an embodiment, data transfer system 200 display suggested text from the second application for the first application to autofill into the first application, as shown in block 214.

Figure 3:
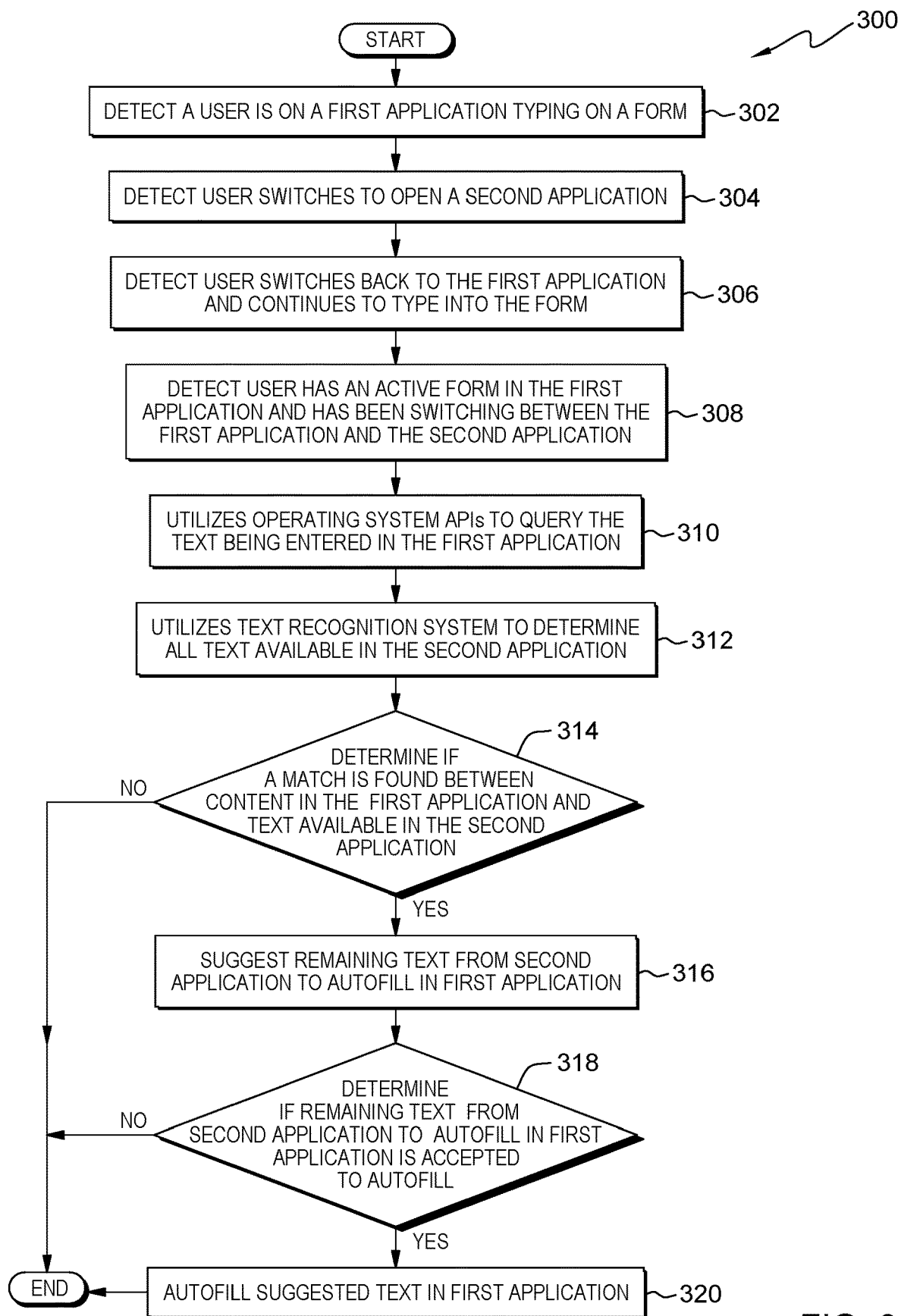
FIG. 3 is a flow chart diagram depicting operational steps for data transfer system, in accordance with at least one embodiment of the present invention.

Referring to FIG. 3, data transfer system 300, in accordance with at least one embodiment of the present invention includes an implementation of the present disclosure and does not imply any limitations with regard to the environments in which different embodiments may be implemented. Many modifications to the depicted environment may be made by those skilled in the art without departing from the scope of the invention as recited by the claims.

The data transfer system 300 detects a user is on a first application typing on a form, as shown in block 302. In an embodiment, data transfer system 300 detects a user is on a first application typing on a form by receiving data of typed text.

The data transfer system 300 detects user switches to open a second application, as shown in block 304. In an embodiment, data transfer system 300 detects a user switches to open a second application by determining a different application is opened, viewed, or deployed.

In an embodiment, data transfer system 300 detects user switches back to the first application and continues to type into the form, as shown in block 306.

In an embodiment, data transfer system 300 detects user has an active form in the first application and has been switching between the first application and the second application, as shown in block 308. An active form can include a form or webpage where the typing is occurring on the first application, unanswered questions or blanks, or a form with empty space for text still.

In an embodiment, data transfer system 300 utilizes operating system APIs to query the text being entered in the first application, as shown in block 310.

In an embodiment, data transfer system 300 utilizes text recognition system to determine all text available in the second application, as shown in block 312.

In an embodiment, data transfer system 300 determines if a match is found between typed content in the first application and text available in the second application, as shown in block 314. Responsive data transfer system determining a match is found between typed content in the first application and text available in the second application, proceeding to block 316.

In an embodiment, data transfer system 300 suggests remaining text from second application to autofill in first application, as shown in block 316.

In an embodiment, data transfer system 300 determines if remaining text from second application to autofill in first application is accepted to autofill, as shown in block 318.

In an embodiment, data transfer system 300 autofills suggested text in first, as shown in block 320.

Figure 4:
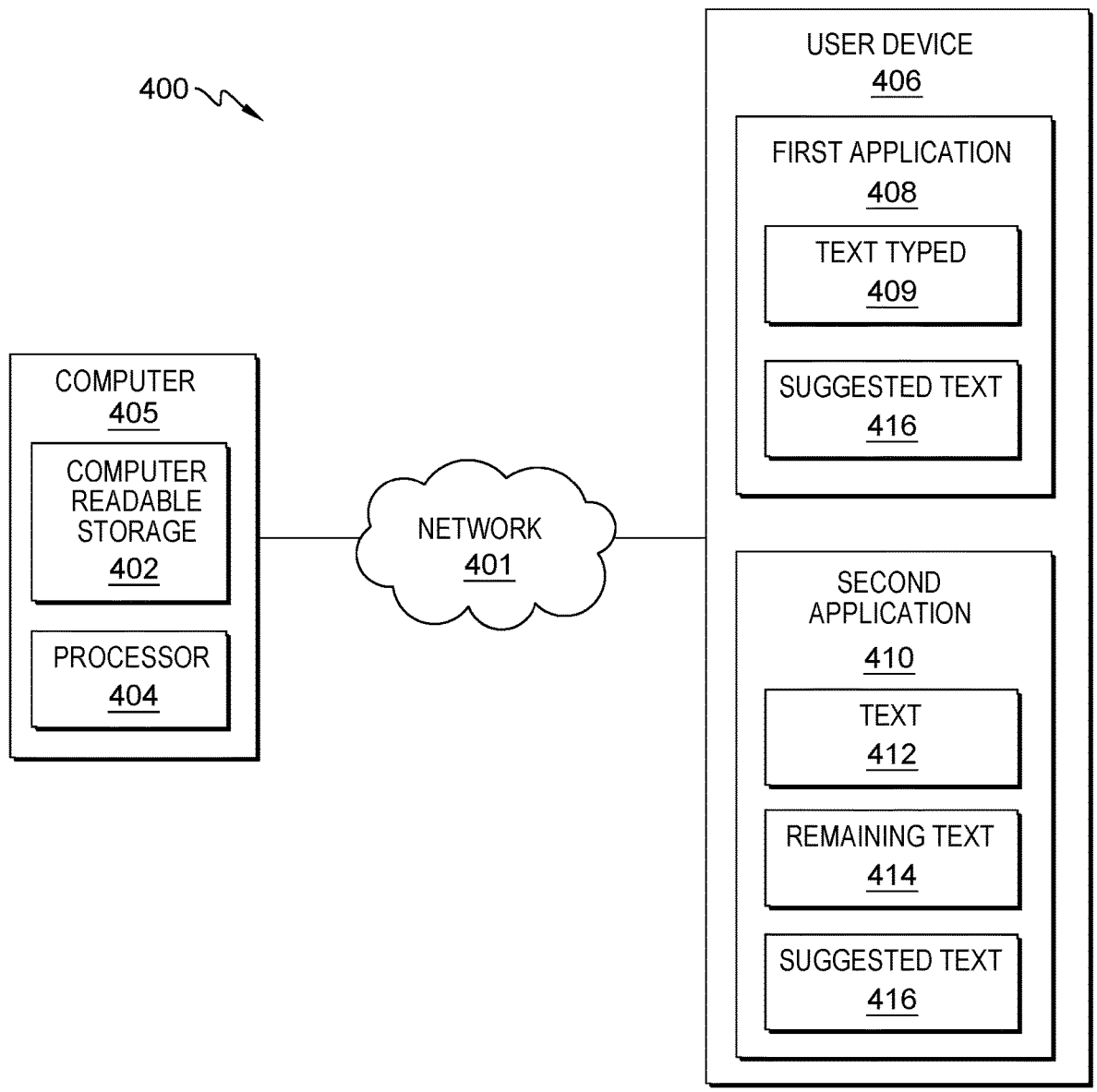
FIG. 4 is a functional block diagram depicting a data transfer system, in accordance with at least one embodiment of the present invention.

FIG. 4 is a functional block diagram for data transfer system, in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

As depicted in FIG. 4, environment 400, includes network 401 connected to computer 405 and user device 406. As depicted, computer 405 includes computer readable storage 402 and processor 404. User device includes first application 408 and second application 410. First application 408 includes text typed 409 and suggested text 416. Second application 410 includes text 412, remaining text 414, and suggested text 416.

In a worked example, data transfer system detects, by computer 405, first application 408 being accessed on user device 406. Data transfer system detects, by computer 405, second application 410 being accessed on user device 406 and first application 408 is accessed again under a predetermined amount of time. Responsive to determining second application 410 is accessed and first application 408 is accessed again under a predetermined amount of time, data transfer system determines, by computer 405, text typed 409 in first application 408 under a predetermined amount of time. Data transfer system determines, by computer 405, at least a portion of text typed 409 in first application 408 matches text 412 from the second application 410. Data transfer system determines, by computer 405, remaining text 414 from the second application 410, wherein remaining text 414 from second application 410 is remaining text 414 that does not match text typed 409 in first application 408. Data transfer system determines, by computer 405, suggested text 416 from second application 410 for first application 408, wherein suggested text 416 is based at least in part, on remaining text 414 from second application 410. Data transfer system displays, by computer 405, suggested text 416 from second application 410 for first application 408 to autofill into first application 408.

What is claimed is:

1. A computer-implemented method for automatically transferring data between applications, the computer-implemented method comprising:
    detecting, by a computer, a first application being accessed on a device;
    detecting, by the computer, a second application being accessed on the device and the first application is accessed again on the device under a predetermined amount of time;
    responsive to determining the second application is accessed and the first application is accessed again under a predetermined amount of time as switching between the first application and the second application, determining, by the computer, text typed in the first application under a predetermined amount of time;
    determining, by the computer, an active form in the first application and the switching between the first application and the second application;
    determining, by the computer, at least a portion of the text typed in the first application matches text from the second application;
    determining, by the computer, remaining text from the second application, wherein the remaining text from the second application does not match the text typed in the first application;
    determining, by the computer, suggested text from the second application for the first application, the suggested text being based at least in part, on the determined remaining text from the second application; and
    sending, by the computer, the suggested text from the second application for the first application to a display to autofill into the first application.

2. The computer-implemented method of claim 1, further comprising:
    receiving an instruction, at the computer, to autofill the suggested text from the second application for the first application into the first application.

3. The computer-implemented method of claim 1, further comprising:
    receiving, by the computer, user input indicating approval of the suggested text from the second application to automatically fill into the first application.

4. The computer-implemented method of claim 1, wherein determining, by the computer, at least a portion of the text typed in the first application matches text from the second application further comprises:
    determining, by the computer, the text typed in the first application is above a predetermined threshold of matching the text from the second application.

5. The computer-implemented method of claim 1, further comprising:
    utilizing, by the computer, an operating system application program interface (API) to query the text typed in the first application.

6. The computer-implemented method of claim 1, wherein determining, by the computer, at least a portion of the text typed in the first application matches text from the second application, further comprises:
    utilizing, by the computer text analysis to determine at least a portion of the text typed in the first application matches the text from the second application.

7. A computer program product for automatically transferring data between applications,
    the computer program product comprising one or more computer readable storage media and program instructions stored on the one or more computer readable storage media, the program instructions including instructions to:
    detect a first application being accessed on a device;
    detect a second application being accessed on the device and the first application is accessed again on the device under a predetermined amount of time;
    responsive to determining the second application is accessed and the first application is accessed again under a predetermined amount of time as switching between the first application and the second application, determine text typed in the first application under a predetermined amount of time;
    determine, by the computer, an active form in the first application and the switching between the first application and the second application;
    determine at least a portion of the text typed in the first application matches text from the second application;
    determine remaining text from the second application, wherein the remaining text from the second application does not match the text typed in the first application;
    determine suggested text from the second application for the first application, the suggested text being based at least in part, on the determined remaining text from the second application; and
    send the suggested text from the second application for the first application to a display to autofill into the first application.

8. The computer program product of claim 7, further comprising instructions to:
    receive instructions to autofill the suggested text from the second application for the first application into the first application.

9. The computer program product of claim 7, further comprising instructions to:
    receive user input indicating approval of the suggested text from the second application to automatically fill into the first application.

10. The computer program product of claim 7, wherein the instructions to determine at least a portion of the text typed in the first application matches text from the second application further comprises instructions to:
    determine the text typed in the first application is above a predetermined threshold of matching the text from the second application.

11. The computer program product of claim 7, further comprising instructions to:
    utilize an operating system application program interface (API) to query the text typed in the first application.

12. The computer program product of claim 7, wherein the instructions to determine at least a portion of the text typed in the first application matches text from the second application, further comprises instructions to:
    utilize text analysis to determine at least a portion of the text typed in the first application matches the text from the second application.

13. A computer system for automatically transferring data between applications,
    comprising:
        one or more computer processors;
        one or more computer readable storage media;
        computer program instructions;
        the computer program instructions being stored on the one or more computer readable storage media for execution by the one or more computer processors;
        and the computer program instructions including instructions to:
            detect a first application being accessed on a device;
            detect a second application being accessed on the device and the first application is accessed again under a predetermined amount of time;
            responsive to determining the second application is accessed and the first application is accessed again on the device under a predetermined amount of time as switching between the first application and the second application, determine text typed in the first application under a predetermined amount of time;
            determine, by the computer, an active form in the first application and the switching between the first application and the second application;
            determine at least a portion of the text typed in the first application matches text from the second application;
            determine remaining text from the second application, wherein the remaining text from the second application does not match the text typed in the first application;
            determine suggested text from the second application for the first application, the suggested text being based at least in part, on the determined remaining text from the second application; and
            send the suggested text from the second application for the first application to a display to autofill into the first application.

14. The computer system of claim 13, further comprising instructions to:
    autofill the suggested text from the second application for the first application to autofill into the first application.

15. The computer system of claim 13, further comprising instructions to:
    receive user input indicating approval of the suggested text from the second application to automatically fill into the first application.

16. The computer system of claim 13, wherein the instructions to determine at least a portion of the text typed in the first application matches text from the second application further comprises instructions to:
    determine the text typed in the first application is above a predetermined threshold of matching the text from the second application.

17. The computer system of claim 13, further comprising instructions to:
    utilize an operating system application program interface (API) to query the text typed in the first application.

18. The computer system of claim 13, wherein the instructions to determine at least a portion of the text typed in the first application matches text from the second application, further comprises instructions to:
    utilize text analysis to determine at least a portion of the text typed in the first application matches the text from the second application.

* * * * *